May 12, 1936.  C. A. BECKER  2,040,639

BALANCE OR WEIGHING SCALE

Filed Jan. 4, 1935

INVENTOR
Christopher A. Becker,
BY
Fraser, Myers & Manley.
ATTORNEYS

Patented May 12, 1936

2,040,639

UNITED STATES PATENT OFFICE 2,040,639

BALANCE OR WEIGHING SCALE

Christopher A. Becker, Nutley, N. J., assignor to The Torsion Balance Company, New York, N. Y., a corporation of New York Application January 4, 1935, Serial No. 346

2 Claims. (Cl. 265—60)

This invention relates to balances or weighing scales, and particularly to the conventional types of analytical balances which are enclosed in a case to protect the movable parts from dust and disturbances by air currents during the weighing operations, and aims to provide certain improvements therein.

Such balances are commonly constructed with a balance beam hung at its middle on a knife edge and having scale pans or the like hung from its ends, one or both ends of the beam being usually provided with an extending screw upon which is threaded a nut for adjusting the equilibrium of the balance preliminary to the weighing operations. In making such equilibrium adjustment the front sash of the enclosing case must usually be raised and lowered several times, which action is time-consuming and not infrequently, owing to the warmth of the hand when handling the adjusting nut, introduces a source of error.

The present invention has for its primary objects the elimination of the source of error above referred to and the provision of means whereby the preliminary adjustment of the equilibrium of a balance can be more expeditiously made. A further object is to provide equilibrium adjusting means which can be either incorporated in new balances or added to existing balances at a relatively small cost and with little expenditure of time and effort.

The foregoing and other objects and advantages of my invention not specifically enumerated but which will be apparent from the detailed description which follows, I accomplish by providing a fine chain supported at one end by the balance beam and at its other end by a movable member having associated means extending through and operable from the exterior of the balance case for varying the amount or weight of chain supported by the beam. The mounting of the chain with respect to both the beam and the chain moving means is such that the equilibrium adjustment of the balance can be made even while the beam is in swinging motion.

A preferred embodiment of my invention is shown in the accompanying drawing, wherein Figure 1 is a fractional front elevation with parts in section, of a portion of a balance showing the present invention as applied thereto.

Figure 1:
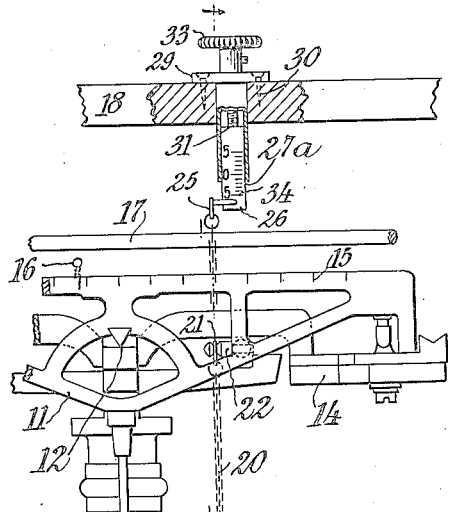
Figure 2:
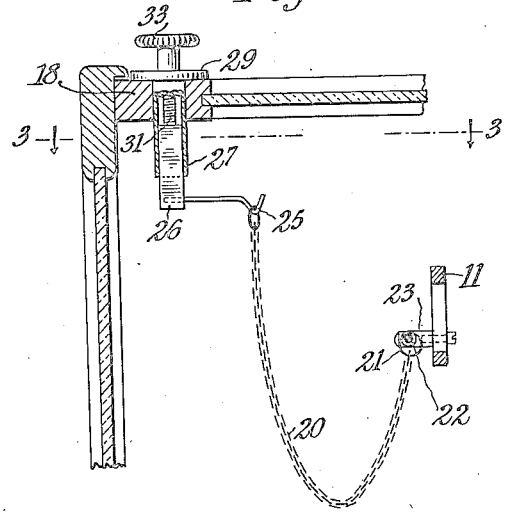
Fig. 2 is a section taken substantially along the plane of the line 2—2 of Fig. 1, the beam arrest and the rider rod being omitted.
Figure 4:
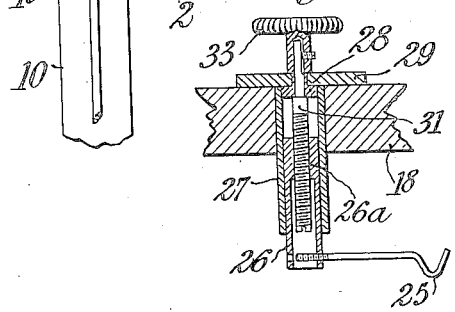
Fig. 4 is an enlarged detailed section of the chain-adjusting means.
Figure 3:
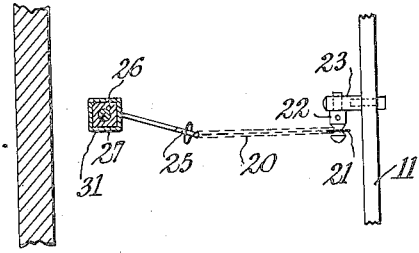
Fig. 3 is a section taken substantially along the plane of the line 3—3 of Fig. 2.

Referring to the drawing, wherein is shown a fractional portion of a conventional analytical or jeweler's balance, let the numeral 10 indicate a column upon which a balance beam 11 is supported through its middle knife edge 12. The balance beam which is of conventional design, has depending therefrom below its central knife edge a pointer 13 and is adapted to have hung from its ends a pair of pans (not shown). For normally maintaining the balance beam knife edges out of contact with their supporting elements and for gradually lowering the knife edges into contact with said elements, there is provided a beam arrest 14 operable in a well known manner by means (not shown). The column 10 and the beam arrest 14 together constitute the balance stand. For making fine weighings the balance beam is graduated along its top edge at 15, over which edge is adjustably mounted a rider 16 adapted to be moved to various positions by a hook (not shown) on a rider rod 17 operable from the exterior of an enclosing case 18 within which the balance parts are housed. The balance parts thus far described are conventional, and per se form no part of my present invention.

For adjusting the equilibrium of the balance preliminary to conducting weighing operations I employ in lieu of the adjusting nut and screw conventionally carried at one or both ends of the balance beam, a fine chain 20 which is hung at one end to the balance beam 11 by having an enlarged ring 21 on the end of the chain engage over and in a V-shaped annular groove on a pin 22 extending parallel to the beam, preferably at the rear thereof, and supported thereby through a stud 23. The chain 20 is preferably of a length to engage below and straddle the beam arrest 14 and have its other end hung from a hook 25 carried by a sleeve 26, which is slidably but non-rotatably movable within a collar 27 fixedly carried by the top frame of the enclosing case. The collar 27 may be fixed to the frame in any desired manner, such for example, by being force-fitted to a nipple 28, which, in turn, carries a disk-like member 29 which may be fastened to the enclosing case frame by screws 30. To provide the non-rotatable slidable connection between the sleeve 26 and collar 27, said parts are preferably formed with complemental flat faces, and as herein shown the sleeve and collar are of complemental square cross-sections.

The upper end of the sleeve 26 is internally screw-threaded to provide a nut 26a, within which engages a screw 31 having a reduced portion extending through the nipple 28 and having affixed to the projecting end thereof a thumb wheel 33. The mounting of the screw 31 with respect to the balance casing is such that as the thumb wheel 33 is rotated the screw-threaded slide 26 will move either upwardly or downwardly, but will be restrained from rotating by engagement of its flat sides with the flat sides of the collar 27.

Preferably the beam component and the slidable sleeve component of the chain 20 are mounted to lie in a vertical plane disposed at a right-angle to the plane of the beam, and the slidable sleeve made to provide an index for indicating the effective length of the slidable sleeve component of the chain. For this purpose the slide is provided with indicia 34 adapted to cooperate with the lower edge 27a of the collar as an index.

From the foregoing detailed description it will be apparent that adjustment of the equilibrium of the balance can be made from the exterior of the enclosing case by merely rotating the thumb wheel 33 to vary the beam component of the chain 20. It will also be appreciated that such adjustment can be made even while the beam is in swinging motion. It will also be apparent that for every balance the inequality of the swings of the pointer 13 to opposite sides of its zero index will bear a definite relation to a given weight of chain, hence the index 34 will serve to greatly expedite bringing the balance into true equilibrium.

The invention, it will be appreciated, is exceedingly simple and can be readily adapted and applied to either new or existing balances; and while I have shown and described but a single embodiment of my invention, I do not wish to be limited to the details of construction disclosed, since it will be apparent to those skilled in the art that said specific construction may be deviated from without departing from the spirit of the invention as claimed.

What I claim is:

1. A balance or weighing scale comprising a stand, a graduated balance beam mounted on said stand, a rider movable along said beam, an enclosing case, a rider rod extending through said case for adjusting the rider on the beam, a movable member within the case and supported thereby, and a chain supported at one end by the beam and at its other end by the movable member for adjusting the equilibrium of the balances before commencing weighing operations, said movable member having means extending through and operable from the exterior of the case for moving the movable member for varying the amount of chain supported by the beam.

2. A balance or weighing scale comprising a stand, a balance beam mounted on said stand, an enclosing case, a non-rotatable movable member within the case and supported thereby, a chain independent of any weighing means for adjusting the equilibrium of the balance before commencing weighing operations, said chain being hung at one end from the beam and connected at its other end to the non-rotatable movable member, and a rotatable member connected to the non-rotatable movable member extending through the case and operable from the exterior thereof for varying the relation of the movable non-rotatable member to the beam whereby to vary the length of the beam component of the chain.

CHRISTOPHER A. BECKER.